United States Patent
Carrier, III et al.

[11] Patent Number: 5,960,196
[45] Date of Patent: Sep. 28, 1999

[54] SOFTWARE RELEASE METRIC REPORTING SYSTEM AND METHOD

[75] Inventors: David F. Carrier, III, Plano; R. John K. Gillespie, Carrollton; Janet Kwai Fun Lui, Dallas; Donald L. Weeks, Jr., Richardson, all of Tex.

[73] Assignee: Alcatel USA Sourcing, L.P., Plano, Tex.

[21] Appl. No.: 08/769,226

[22] Filed: Dec. 18, 1996

[51] Int. Cl.⁶ .............................. G06F 11/34; G06F 17/30
[52] U.S. Cl. .................. 395/701; 395/703; 395/704; 707/203; 714/38
[58] Field of Search .................................. 395/701, 704, 395/709, 712, 200.35, 183.14, 703; 707/203, 511; 714/38; 709/205

[56] References Cited

U.S. PATENT DOCUMENTS

| | | | |
|---|---|---|---|
| 4,558,413 | 12/1985 | Schmidt et al. | 364/300 |
| 4,751,635 | 6/1988 | Kret | 364/200 |
| 4,809,170 | 2/1989 | Leblang et al. | 395/703 |
| 4,864,569 | 9/1989 | DeLucia et al. | 395/704 |
| 4,912,637 | 3/1990 | Sheedy et al. | 364/300 |
| 4,951,192 | 8/1990 | Chase, Jr., et al. | 364/200 |
| 5,155,847 | 10/1992 | Kirouac et al. | 395/600 |
| 5,157,779 | 10/1992 | Washburn et al. | 395/183.13 |
| 5,291,598 | 3/1994 | Grundy | 395/650 |
| 5,339,435 | 8/1994 | Lubkin et al. | 395/700 |
| 5,446,895 | 8/1995 | White et al. | 395/701 |
| 5,490,249 | 2/1996 | Miller | 395/183.14 |
| 5,530,964 | 6/1996 | Alpert et al. | 395/709 |
| 5,649,200 | 7/1997 | Leblang et al. | 395/703 |
| 5,651,111 | 7/1997 | McKeeman et al. | 395/183.14 |
| 5,655,074 | 8/1997 | Rauscher | 395/183.14 |
| 5,729,746 | 3/1998 | Leonard | 395/701 |

OTHER PUBLICATIONS

Banker, et al., "Automating Output Size and Reuse Metrics in a Repository–Based Computer–Aided Software Engineering (CASE) Environment", IEEE Transactions on Software Engineering, vol. 20, No. 3, Mar. 1, 1994, pp. 169–187.

Schneidewind, "Setting Maintenance Quality Objectives and Prioritizing Maintenance Work by Using Quality Metrics", IEEE, Oct. 15, 1991, pp. 240–249.

"Software Compiler for Analyzing and Measuring Programs", IBM Technical Disclosure Bulletin, vol. 36, No. 9A, Sep. 1, 1993, pp. 123–127.

IBM Technical Disclosure Bulletin, "Software Packaging and Verification Aid," vol. 36, No. 06A, pp. 223–225, Jun. 1993.

Walter F. Tichy, "RCS—System for Version Control," 4.4BSD Programmer's Supplementary Documents, A USENIX Association Book, tab 13, Apr. 1994.

Liu et al, "SEMST—A Support Environment For the Management of Software Tresting," IEEE, pp. 11–20, Aug. 1992.

*Primary Examiner*—Tariq R. Hafiz
*Assistant Examiner*—Tuan Q. Dam
*Attorney, Agent, or Firm*—Baker & Botts, L.L.P.

[57] ABSTRACT

A metric collector (530) provides a list of available metrics related to software development, test, and load building for the user's selection. A suite of tools (532) are executed in response to the user's selection to access a number files for data and to compute the selected metrics. A report is then generated to summarize the computed metrics.

19 Claims, 9 Drawing Sheets

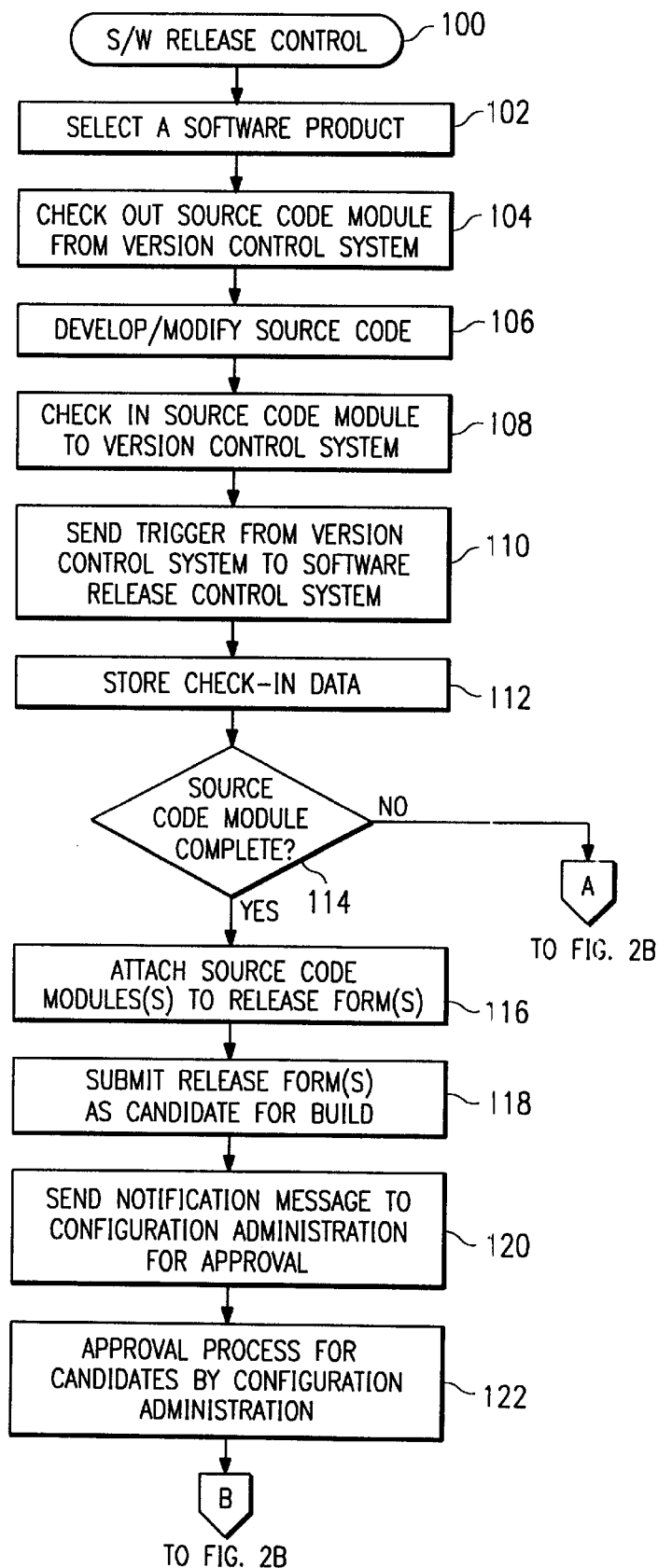

SOFTWARE RELEASE METRIC REPORTING SYSTEM AND METHOD

RELATED APPLICATIONS

This patent application is related to co-pending U.S. patent applications: U.S. patent application Ser. No. 08/724,830, entitled Software Release Control System and Method, filed Oct. 2, 1996, of the same assignee; U.S. patent application Ser. No. 08/769,634, entitled Software Release Media Download System and Method, filed Dec. 18, 1996, of the same assignee; U.S. patent application Ser. No. 08/768,405, entitled Software Documentation Release Control System, filed Dec. 18, 1996, of the same assignee; and U.S. patent application Ser. No. 08/769,225, entitled Software Testing Process Control System and Method, filed Dec. 18, 1996, of the same assignee.

TECHNICAL FIELD OF THE INVENTION

This invention is related in general to the field of computer software systems. More particularly, the invention is related to a software release metric reporting system and method.

BACKGROUND OF THE INVENTION

Large-scale software development efforts require proper coordination and management of teams of software engineers and test engineers. When a software development effort involves a large group of engineers simultaneously working on multiple versions and releases of a large number of different source modules of the software product, confusion and inefficiency easily results if the development process and subsequent product release are not properly managed.

For example, some engineers may be coding source modules for version 3.1 of a software product X, while some engineers may be incorporating newer features into source modules for version 4.0, and still some engineers may be providing a fix to some problems reported in source modules of version 2.1. Note that it is possible to have overlap between the three groups of engineers, so that an engineer may be involved in all three efforts.

Compounding the problem is the fact that each version of a software product must pass through multiple developmental stages prior to its release, where advancing to the next stage requires the passing of some predetermined testing and approval process. To be tested, all the source modules for that version of the software product must be collected and built into a load. The process of load building is also called compiling and linking of all the source modules. The resultant load or build is the software product to be tested or to be delivered to the customers when all the developmental stages have been passed.

Previously, the process of computing, collecting, and keeping track of certain metrics or statistics related to the software development and testing process was done manually and in a haphazard manner. The metrics are desirable for measuring various aspects of the code development and testing process, and may be collected from a variety of sources. For example, from the source code, the number of lines of code, the number of lines of lines of code changed in a work session; and from test devices, the number of lines tested. The metrics are obtained and analyzed to ensure integrity in the code development and testing process, and to provide information for auditing purposes.

It may be seen that because the software development involves the iterative performance of code writing, code inspection, load building, and testing, considerable savings in time, energy, and funds are possible if the metric collecting and reporting process is automated and better integrated with the software release process.

SUMMARY OF THE INVENTION

Accordingly, there is a need for apparatus and method for collecting and reporting metrics associated with software development and testing that automate, stream line the process, and address the disadvantages associated with prior systems and methods.

In one aspect of the invention, a method for software metric collection includes the steps of providing a listing of available metrics for selection by a user, executing metric tools in response to the selection of metrics, computing the selected metrics, and generating a report of the computed metrics.

In another aspect of the invention, a metric reporting system includes a metric collector adapted for receiving a user's specification of metrics. The metric collector uses a plurality of metric tools to compute the selected metrics. The tools are each adapted for accessing data from a plurality of sources and computing a metric in response to the user's specification.

BRIEF DESCRIPTION OF THE DRAWINGS

For a better understanding of the present invention, reference may be made to the accompanying drawings, in which:

FIGS. 2A and 2B are an exemplary flowchart of a software release control process according to the teachings of the present invention;

DETAILED DESCRIPTION OF THE INVENTION

Figure 1:
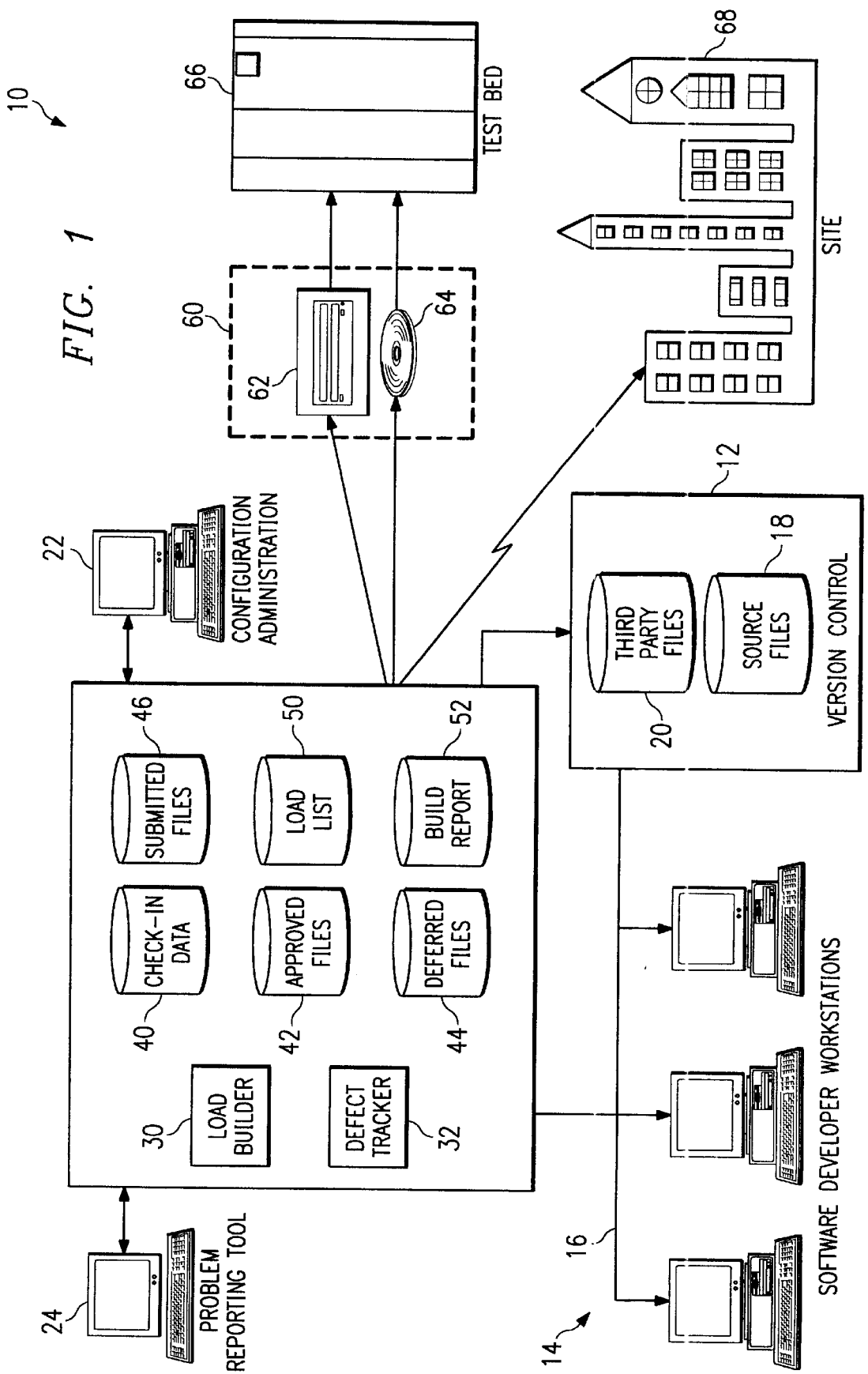
FIG. 1 is a simplified block diagram of an exemplary software release control system constructed according to the teachings of the present invention.

The preferred embodiment(s) of the present invention is (are) illustrated in FIGS. 1–12, where like reference numerals being used to refer to like and corresponding parts of the various drawings.

Referring to FIG. 1, a block diagram of a software release control system 10 constructed according to the teachings of the present invention is shown. Software release control system 10 uses a version control subsystem 12 to manage the numerous versions of software modules or files developed by software engineers. Version control subsystem 12 may be coupled to software release control system 10 and a number of workstations, personal computers, terminals, or any suitable data display and entry device 14, via a computer network 16. At least two databases or files are included in version control subsystem 12—source files 18 for storing source modules being developed or modified, and third party files 20 for storing source modules of third party software that will be incorporated into the load. During code development, engineers check out source files to work on and check them back in at the end of the work session. Version control subsystem 12 generally keeps track of what changes were made to the file. Examples of available version control subsystems include ClearCase by Pure Atria Software of Shaumburg, Ill.; Control Version System by Free Software Foundation of Cambridge, Mass.; DSEE by Hewlett Packard of Palo Alto, Calif.

Further coupled to software release control system 10 is another data display and entry device 22 provided for configuration administrator(s), who has authority to initiate and oversee the load building process. A problem reporting tool 24, represented in FIG. 1 by a data display and entry device, is also coupled to software release control system 10. Problem reporting tool 24 is used to record problems reported by customers, test engineers, and other sources. Each problem report is assigned a unique problem report number for tracking and auditing purposes.

Software release control system 10 includes a number of tools, including a load builder 30 and a defect tracker 32. A number of files or databases are also included for storing a variety of data: check-in data 40, approved files 42, deferred files 44, submitted files 46, load list 50, and build report 52. Check-in data database 40 stores records associated with source modules that have been checked into version control subsystem 12. Check-in data 40 may include the developer's name, file name, check-in number, product, release, check-in time, total number of lines, number of lines changed, etc. Approved files database 42 stores data associated with source modules that have received approval for inclusion into a build, while deferred files database 44 stores data associated with source modules that have been denied inclusion into a build. Submitted files database 46 stores data associated with those source modules that have been attached to release forms. Release forms are logical groupings of source modules collected and submitted for the build process. Load list file 50 contains a list of built modules and third party software that have been identified to go onto deliverable media. The load list is used during generation of the deliverable media. Build report database 52 stores data generated from the load building process. Hard copy reports may then be generated from data stored in build report database 52.

After a load is built, it may be downloaded to a portable storage medium 60, such as a tape 62 and compact disc 64. Storage medium 60 containing a load may then be tested on a test bed 66. In addition, the load may be electronically transferred to a remote site 68, via telecommunications networks or computer networks, for operations and/or testing.

Figure 2B:
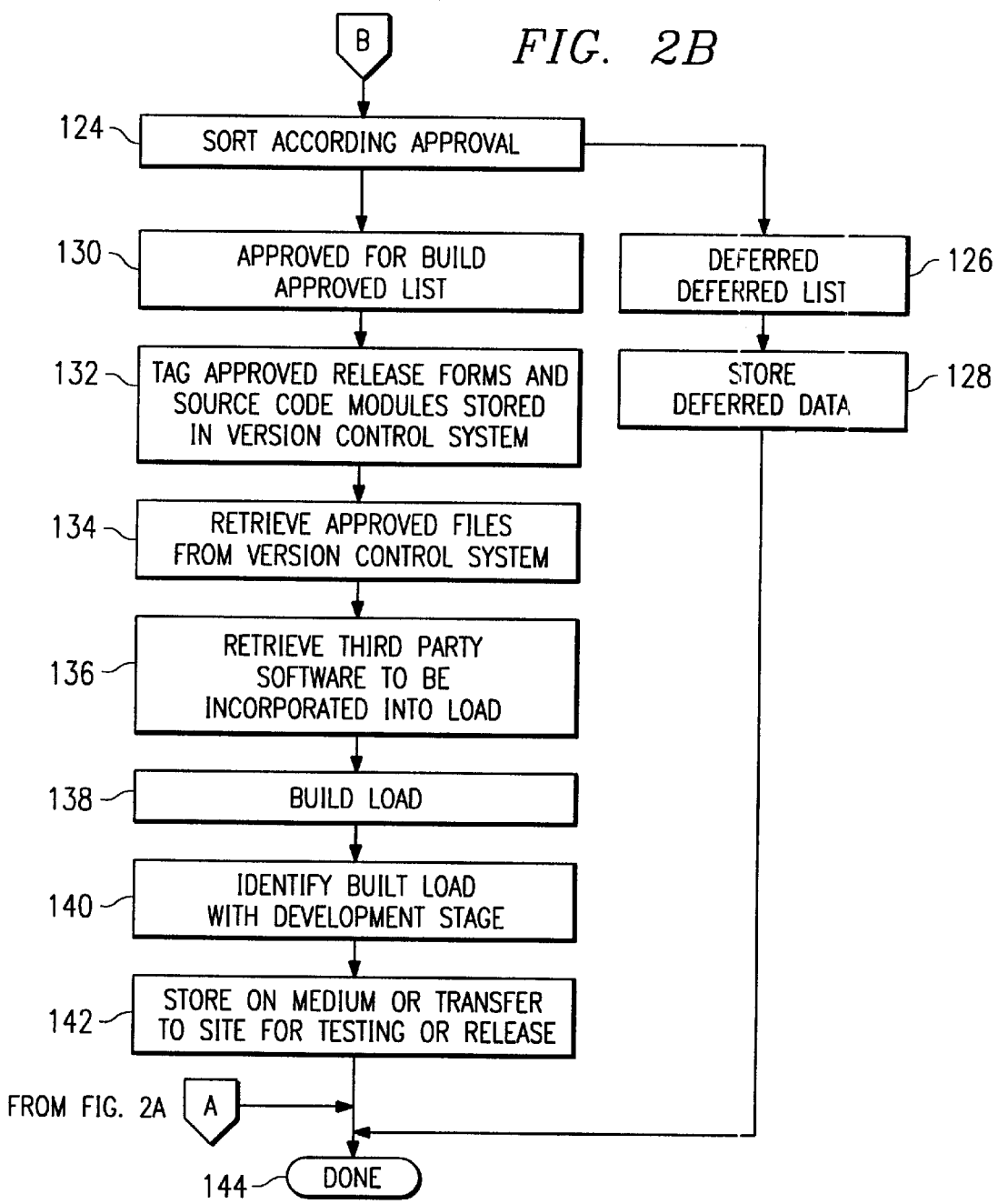

FIGS. 2A and 2B is a flowchart describing the process of software release control 100. References may also be made to various system components shown in FIG. 1 and to the diagram in FIG. 3 providing an illustration of the process.

Figure 3:
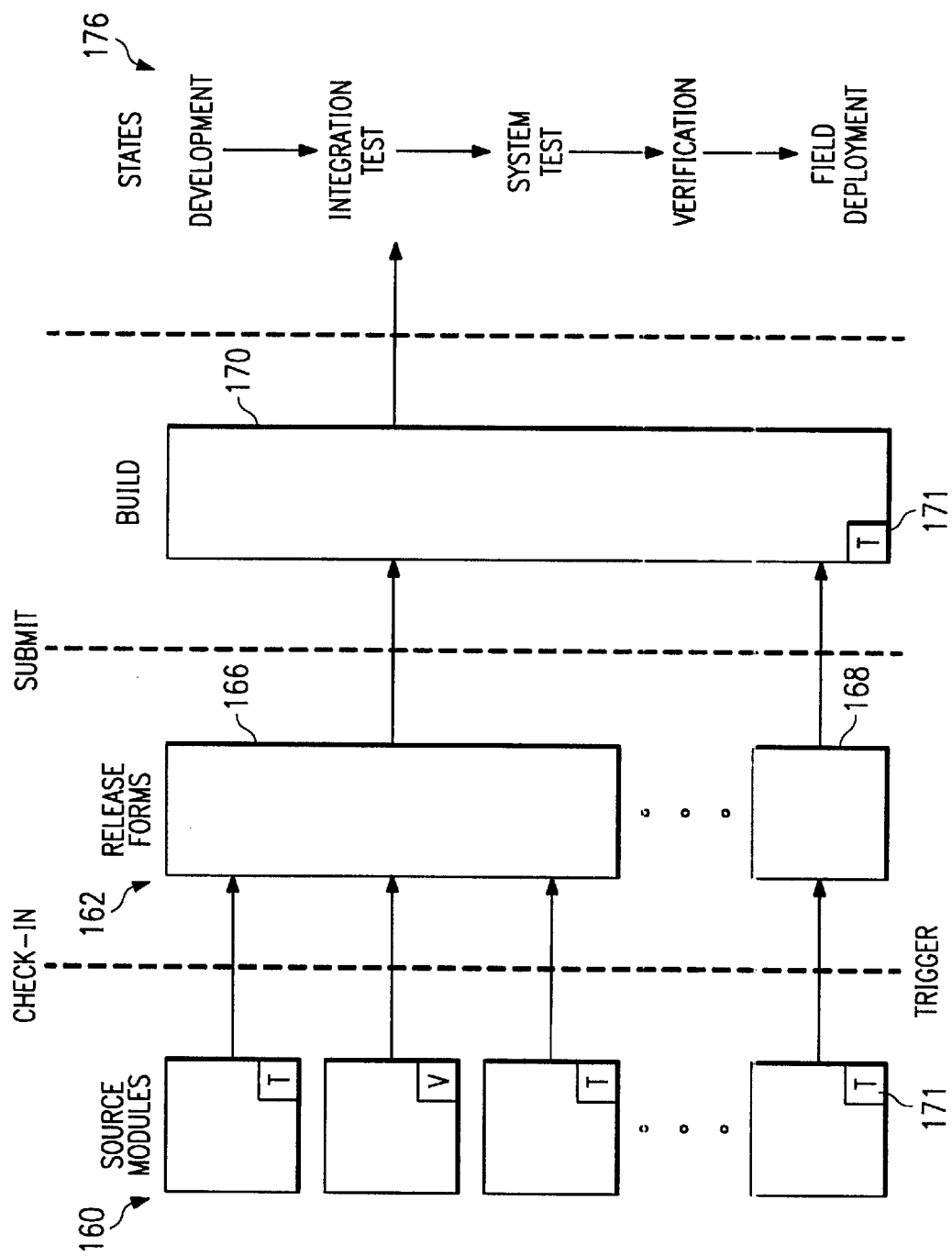
FIG. 3 is a block diagram illustrating the software release control process.

A user, typically a software engineer engaged in the development, modification, or testing of software code, logs into system 10 and selects a software product from a displayed list of existing or developing software products, as shown in block 102. If the source module that the engineer desires to work on is already checked into version control subsystem 12, then it is checked out therefrom, as shown in block 104. The engineer then codes or modifies the source module, as shown in block 106. At the end of the work session, the source module is checked back into version control subsystem 12 in block 108. When a source module is checked into version control subsystem 12, a trigger sends check-in data to software release control system 10, as shown in block 110. This check-in process is shown in FIG. 3, where source modules 160 are checked into version control subsystem 12 and causing triggers to be invoked and received by software release control system 10.

In block 112 of the flowchart, the check-in data are stored by software release control system 10. If the source module is completed, then its associated check-in data may be attached to open release form 166 and 168, as shown in block 116 and illustrated in FIG. 3. A release form is a logical grouping of check-in data associated with source modules checked into version control subsystem 12. A release form is typically associated with a particular problem report number or feature specification documentation number. When a release form is associated with a problem report number, the source modules associated therewith are developed or modified in response to the problem reported. When a release form is associated with a feature specification documentation number, the source modules associated therewith are typically developed for a new release. Once the release forms are complete, they are submitted as candidates for a particular build 170, as shown in block 118 and illustrated in FIG. 3.

Software release control system 10 preferably provides a graphical and menu-driven user interface for prompting for data entry and displaying options. For example, to attach check-in data of source modules to a release form, the user may select from a list of possible functions related to release forms, such as listing of currently open release forms, creating a new release form, attaching check-in data to a release form, submitting a release form, etc. A pointing device such as a mouse may be used to select the desired option from the list. To attach check-in data to release forms, the user may select the appropriate option, which brings up a list of currently open release forms for selection. The selection of a release form then causes a list of unattached check-in data for the software product in question that are associated with the particular user. The user may then select one or more check-in data for attachment to the release form. The user may also be prompted to provide additional data for each check-in data selected, such as the date of any preliminary logical inspection of the source module (such as a Fagan inspection), a problem report number or a feature specification documentation number, etc.

Returning to FIGS. 2A and 2B, in block 120, when release forms are submitted for a build, an electronic notification message may be automatically generated and sent to designated personnel having the responsibility of assigning and approving submitted release form(s) to a particular build, such as a configuration administrator. The configuration administrator may then assign the release form to a build and approve the build, as shown in block 122. The release forms are sorted according to approval—those release forms approved for a build and those release forms not approved for a build, as shown in blocks 124 and 126. The release forms not approved for a build may be deferred for a later build, and the associated data are stored, as shown in block 128. Although not shown explicitly, release forms may also be disapproved or rejected for a number of reasons, which may be unsubmitted or deleted from system 10 after a predetermined time period. In block 130, the approved release forms are then provided in a list, which is used to tag or label all source modules 160 stored in database 18 that are to be included in build 170, as shown in block 132 and FIG. 3. The build label identifies the product, version, and build in which the tagged source modules will be incorporated. System 10 further provides for the permanent identification 171 of versions of source modules 160 with a specific build 170 of a product.

A configuration administrator may initiate a build after all necessary release forms have been submitted, approved, assigned, and tagged. Software release control system 10 first retrieves source modules that bear the appropriate build label from version control subsystem 12, as shown in block 134, and also retrieves any third party software from version control subsystem 12, as shown in block 136. A build script is then invoked and executed to compile and link the source modules, third party software, and any other files necessary for the execution of the resultant software product, as shown in block 138. As shown in FIG. 3, the built load may be in any one of development stages 176: development, integration test, system test, verification, and field deployment, and is so identified in its load number or part number identifier. For example, a load number may indicate, sequentially, the customer identifier, part number, release, point release, maintenance release, feature release, development state V, and version number. Development state V may indicate the verification stage, for example. In block 142, the build may then be downloaded to a portable storage medium for delivery to a customer, electronically transferred to a desired destination for delivery or testing, or downloaded to a test bed for testing purposes. A build report summarizing information related to the build may also be generated.

Figure 4:
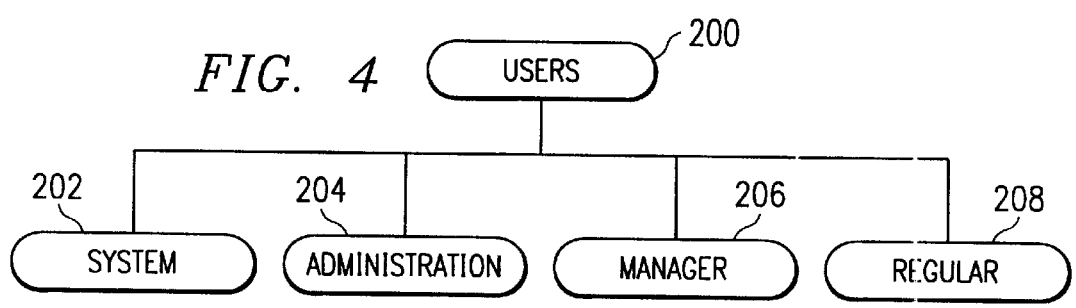
FIG. 4 is a diagram illustrating the users of software release control system.

It may be seen that software release control system 10 preferably provides a number of security levels to users having differing needs and assigned tasks. Referring to FIG. 4, users 200 of system 10 may be assigned roles, such as system 202, administration 204, manager 206, and regular 208. For example, regular users 208 may have access to those functions related to creating release forms, attaching the source modules to release forms, and submitting release forms. Manager users 206 may have the additional ability to assign release forms to builds for those software products for which they have authorization during selected development stages, such as development and integration test. Administration users 204 may additionally have access to build administration functions, such as initiating the tagging source modules with build labels and specifying third party software. System users 202 may have unrestricted access to all resources.

Figure 5:
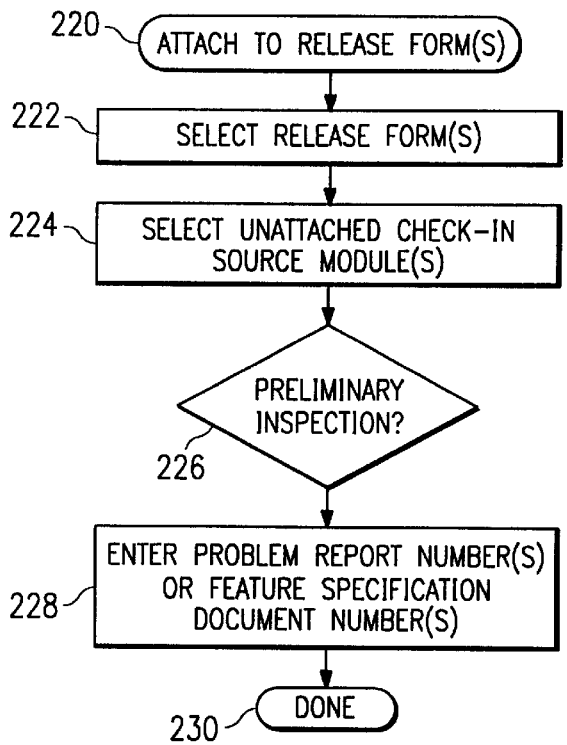
FIG. 5 is an exemplary flowchart of a process to attach source modules to release forms.

FIG. 5 provides additional details on an exemplary process to attach a source module to a release form 220. From a display of a list of open release forms, the user may select one or more release forms, as shown in block 222. A listing of source modules associated with the user and checked into version control subsystem 12 are then displayed for the user's selection, as shown in block 224. For each selected source module, the user is prompted to provide certain predetermined information, such as whether a preliminary inspection, for example Fagan inspection, was performed and date of the inspection, as shown in block 226. The user will also be prompted to enter problem report number(s) or feature specification document number(s) associated with the source module, as shown in block 228. Software release control system 10 then groups the selected source module with the selected release form. The attachment process ends in block 230.

Figure 6:
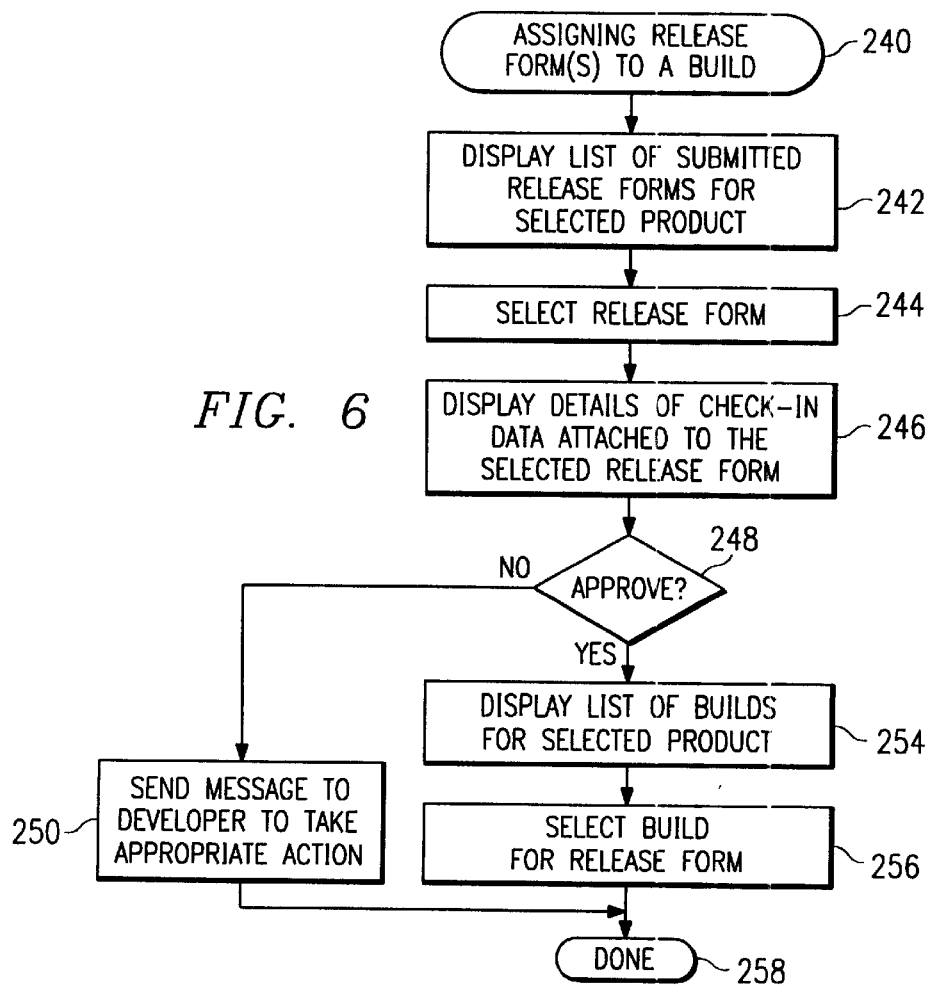
FIG. 6 is an exemplary flowchart of a process to assign release forms to a build.

As described above, after source modules are attached to release forms primarily by the engineers or developers, the release forms are then assigned to a build, primarily by build administrators. Referring to FIG. 6, an exemplary assignment process 240 is shown. A list of release forms submitted for a given product is displayed, as shown in block 242. The user, such as build administrator, selects a release form from the list, as shown in block 244. In block 246, details of check-in data associated with the selected release form are then displayed, so that the user may review the details and indicate his/her approval, as shown in block 248. If the user disapproves of the release form, then an electronic message may be generated and sent to the developer(s) associated with the source modules so that appropriate action may be taken, as shown in block 250. If the release forms are approved, then a list of builds for the selected software product is displayed, as shown in block 254. The user may then select the build that will incorporate the approved release form, as shown in block 256. The process ends in block 258 thereafter.

Figure 7:
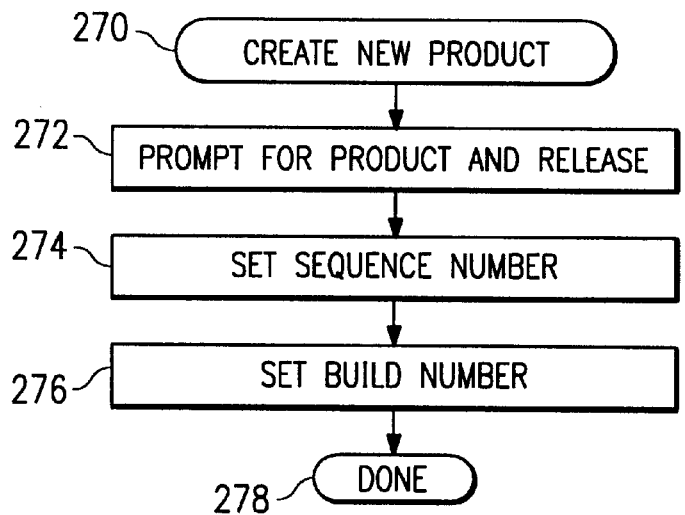
FIG. 7 is an exemplary flowchart of a create new product process.

Referring to FIG. 7, an exemplary process 270 for creating a new software product in software release control system 10 is shown. As described above, it is preferable to limit access to this function to users with system authority. When this option is selected, system 10 prompts for the product identifier and release number, as shown in block 272. A sequence number and a build index number are then set by system 10, as shown in blocks 274 and 276. For example, sequence number may be set to 1 and the build index number may be set to 0. The process ends in block 278. When the user enters product and release number of an existing product, error messages may be displayed.

Figure 8:
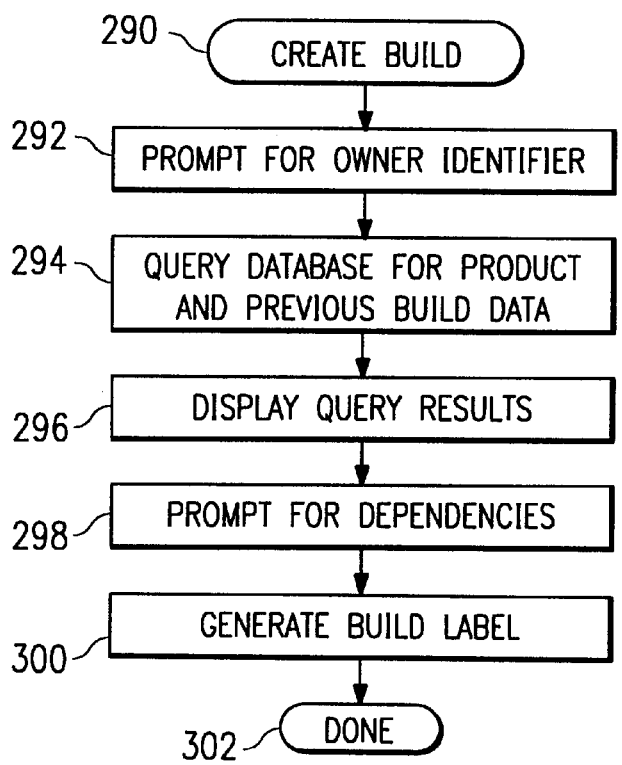
FIG. 8 is an exemplary flowchart of a process to create a build.

FIG. 8 shows an exemplary process for creating a new build 290. When this function is selected by the user, the screen displays a prompt for the user to identify the owner of the build, as shown in block 292. system 10 then queries and obtains from the check-in database information on software products and previous builds known to be related to the owner identifier entered by the user, as shown in block 294. The result is displayed for the user to select the software product and a build, as shown in block 296. Dependencies such as operating system and environment variables which specify certain values to be used in the build are either copied from an existing build and modified or entered by the user for the new build, as shown in block 298. Other information such as specifying third party software may also be entered at this time. A build label for the new build is then generated, based on the information given, as shown in block 300. The create new build process ends in block 302.

Figure 9:
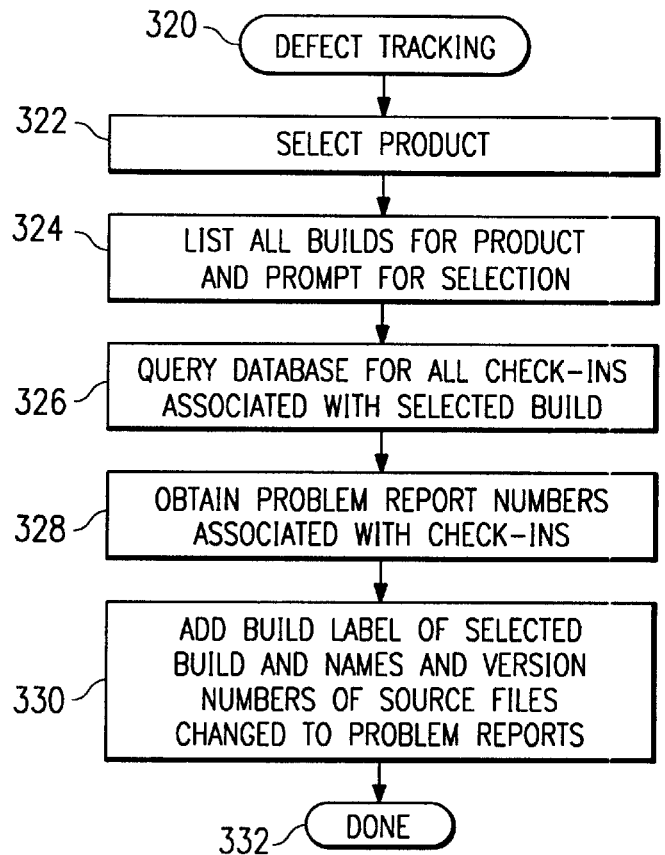
FIG. 9 is an exemplary flowchart of a process for defect tracking.

As described above, software release control system 10 is also capable of tracking defects in previous versions and how these defects are fixed in subsequent versions. An exemplary process 320 performed by defect tracker 32 (FIG. 1) is shown in FIG. 9. References are also made to FIG. 10, which provides a graphical illustration of the process. A product and a build are first specified or selected from lists displayed by system 10, as shown in blocks 322 and 324. With this information, defect tracker 32 obtains a list of all check-in data of all source modules associated with the selected build and product, as shown in block 326. Problem report numbers that are specified in the check-in data are then obtained, as shown in block 328. As identified by the problem report numbers, those problem reports stored in problem reporting tool 24 (FIG. 1) are labeled with the build label of the present build, as shown in block 330.

Figure 10:
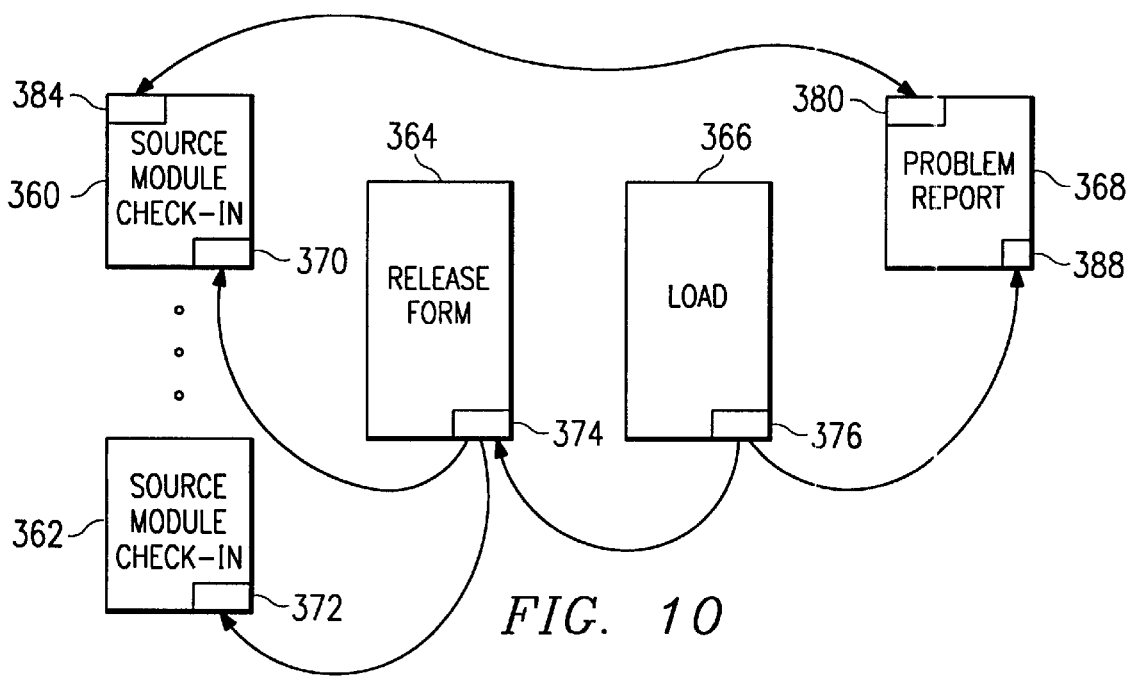
FIG. 10 is a block diagram illustrating defect tracking.

It may be seen in FIG. 10 that source module check-in data 360 and 362, a release form 364 that includes check-in data 360 and 362, and load 366 are all tagged with a build label 370–376. In determining which check-in data and correspondingly, which source module contains the code for fixing a known defect, a problem report number 384 associated with check-in data 360 is used to identify a problem report 368 with the problem report number identifier 380. Problem report 368 is then tagged with a build label 388 that corresponds to load 366. Therefore, the proper association between a load and problem report(s) is made.

Figure 11:
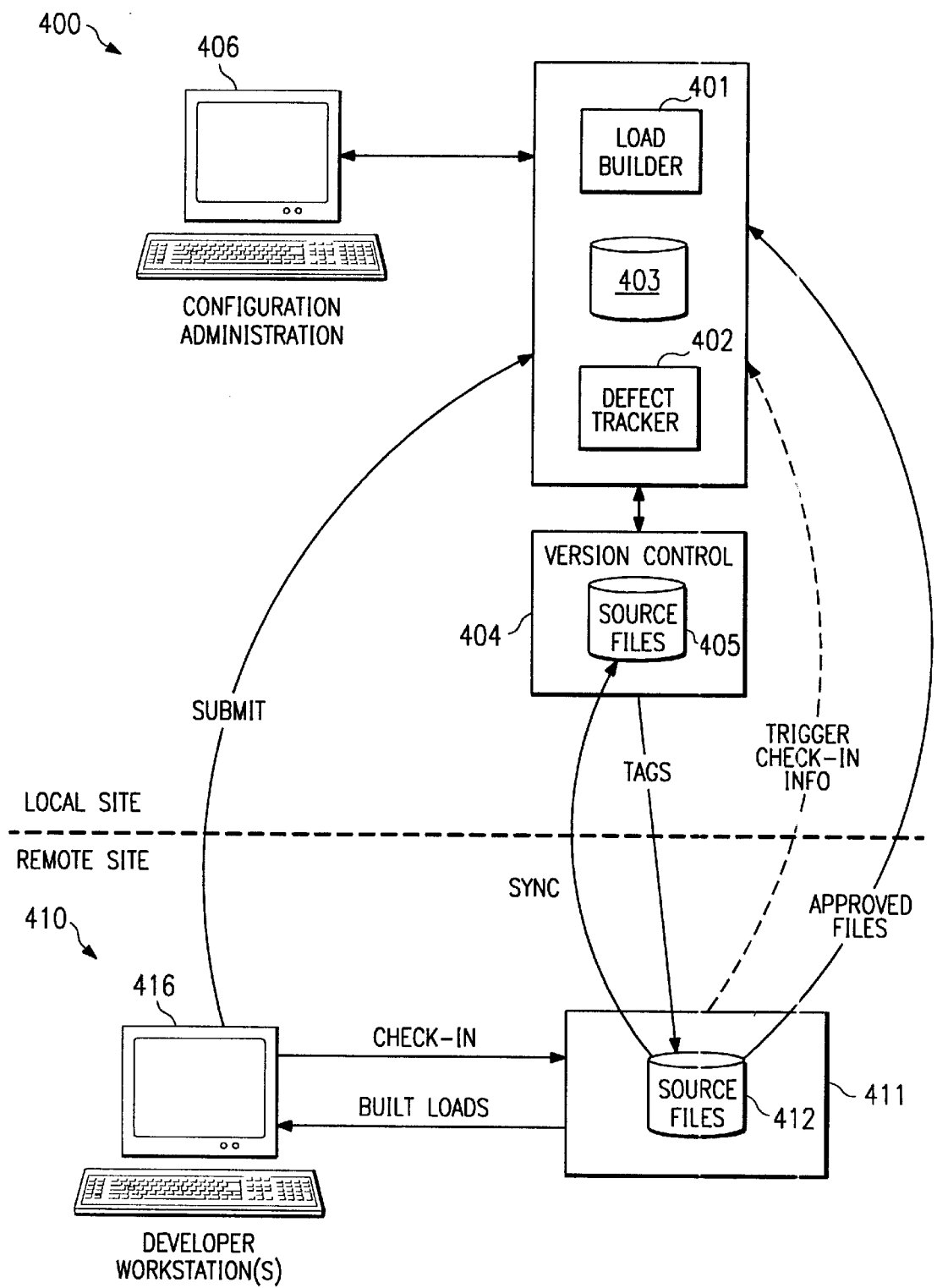
FIG. 11 is a simplified block diagram of a remote access to software release control system.

FIG. 11 shows that a software release control system 400 may also be accessed from a site 410 located remotely from system 400. Software release control system 400 includes a load builder 401, a defect tracker 402, and a database 403, which stores a number of files as described above in conjunction with FIG. 1. A version control subsystem 404 having a database storing source files 405 is coupled to system 400. A workstation 406 may also be coupled to system 400 to provide administrator access thereto. At remote site 410, a second version control subsystem 411 storing source files 412 generated and/or maintained by software engineers at remote site 410 is provided. Version control subsystem 411 is coupled to developer workstations, personal computers, and other suitable tools 416 which facilitate code development.

At the end of a work session, a software engineer checks in source modules to remote version control subsystem 411, which are then stored in source files database 412. As the source modules are checked in, a trigger is invoked and sent to software release control system 400. Similar to the local site application as shown in FIG. 1, the trigger includes check-in data. The trigger may be transmitted over telecommunications networks, computer networks, or a dedicated line, as deemed suitable. In a periodic manner, packets containing the contents of source files database 412 are electronically copied to source files database 405 of local version control subsystem 404 to synchronize the databases, so that the contents thereof are essentially identical over time.

When a user has completed the source modules, he/she may attach them to one or more release forms and then submit the release forms for a build, in the same manner as described above. When release forms are approved for a build, the corresponding source modules stored in remote source files database 412 that make up the release form are tagged with the appropriate build label. The load building process obtains approved files or source modules from remote version control subsystem 411 to build the load. Defect tracking for the remote site is performed in a similar manner as described above, where a build label becomes associated with problem reports. Constructed in this manner, developers may be submit source files from one or more remote sites to one local software release control system for load building and defect tracking.

Figure 12:
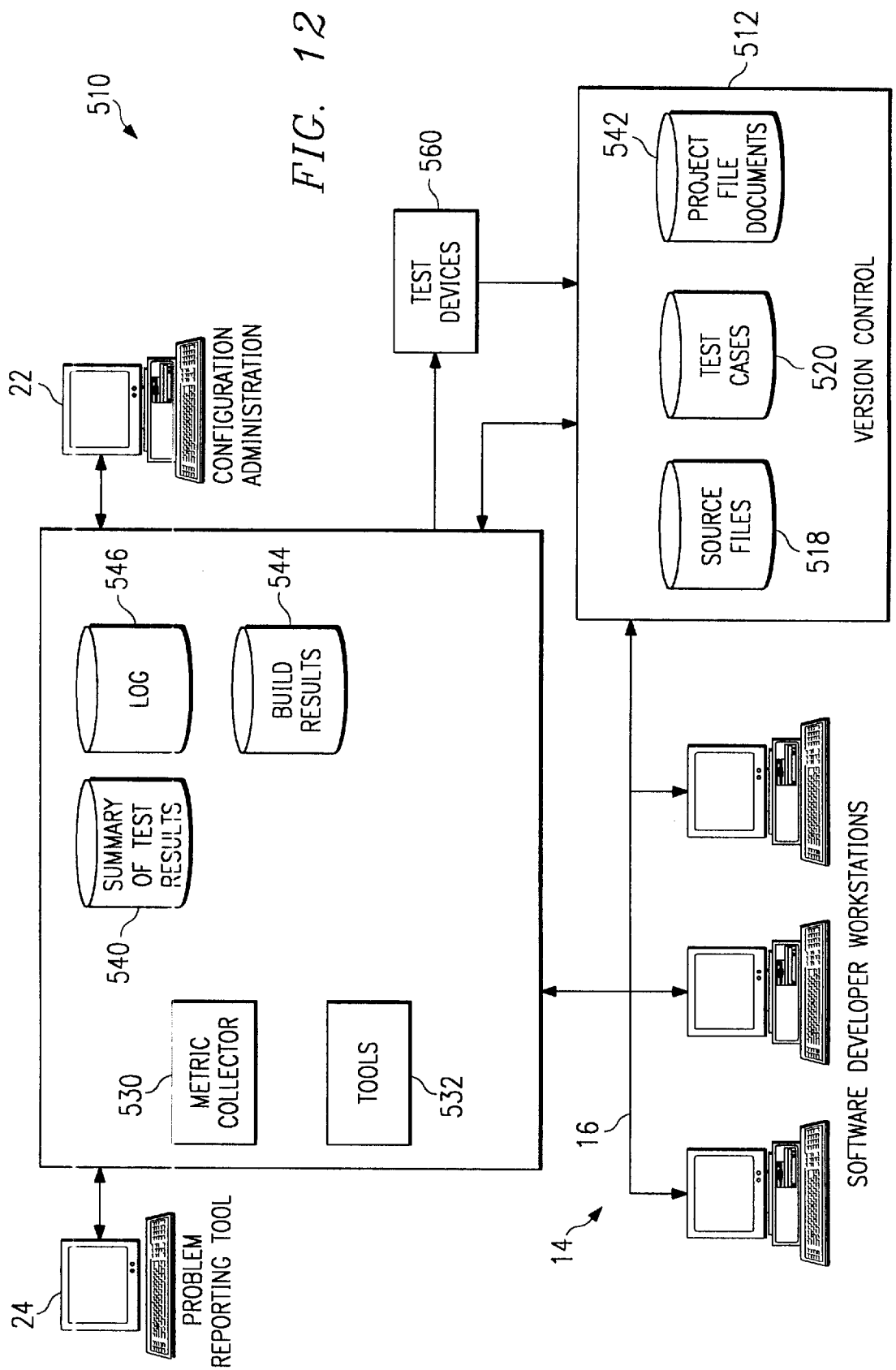
FIG. 12 is a simplified block diagram of an exemplary metric collecting and reporting system according to the teachings of the present invention.

Referring to FIG. 12, a metric collection and reporting subsystem 510 of the file release control system is shown. System 510 includes a metric collector and reporter 530 (hereinafter referred to as metric collector 530). Stored in a version control subsystem 512 are source files 518, test cases 520, and project file documents 542. Metric collector 530 generally collects, computes, and reports statistics related to all aspects of the file release control system, for example, during code development, during code inspections, during load building, during testing, during media downloading, etc. A graphical user interface (not shown) may be used to provide a list of available metrics that a user may select from to generate a report. Given the selection of metrics, metric collector 530 then executes a metric tool 532 associated with one or more metric. The metric tools 532 may access a number of sources of information, compute, and generate the desired metric. The metric is then provided to metric collector 530, which generates a printed or on-line report of the selected metrics. The format of the metric reports may also be selected from existing formats or generated by the user.

Many types of metrics may be available and may include: the number of lines of code in a source module, the number of lines changed in a source module, the number of times a source module is modified from build to build, the number of defects fixed in a source module, what defects are fixed in a source module, the number of lines of code underwent a Fagan inspection, the number of lines of code tested, the number of source modules tested, the success or failure of testing, the success or failure of load building, the amount of time to build a particular load, the number of project file documents, etc.

It may be seen that metric collector 530 may access a number of files or databases in order to collect and compute the metrics. For example, metric collector 530 may access a summary of test results file or database 540 which stores test cases and test results from test devices 560. A build results directory 544 storing compiled and linked source modules and other files generated during the load building process may also be accessed by metric collector 530 to generate metrics on the builds. A problem reporting tool 24 which provides defect tracking may also be accessed by metric collector 530. Metric collector 530 may also access a log 546 which is used to record what files were copied onto deliverable storage media during media download. Further, source files 518, test cases 520, and project file documents 542 stored in version control subsystem 512 are also accessible to metric collector 530.

Constructed and automated in this manner, metric collection and reporting is a process integrated with file release control and automated for greater ease of use.

Although the present invention and its advantages have been described in detail, it should be understood that various changes, substitutions and alterations can be made therein without departing from the spirit and scope of the invention as defined by the appended claims.

What is claimed is:

1. A method for software metric collection, comprising the steps of:
   providing a listing of available metrics for selection by a user;
   executing metric tools for accessing data from a plurality of sources in response to the selection of metrics;
   computing the selected metrics for a selected code under development;
   generating a report of the computed metrics; and
   integrating the computed metrics into a software release process for the selected code under development.

2. The method, as set forth in claim 1, further comprising the step of accessing a build results file for data to compute a selected metric.

3. The method, as set forth in claim 1, further comprising the step of accessing a test summary file for data to compute a selected metric.

4. The method, as set forth in claim 1, further comprising the step of accessing a problem reporting tool for data to compute a selected metric.

5. The method, as set forth in claim 1, further comprising the step of accessing a media download log for data to compute a selected metric.

6. The method, as set forth in claim 1, further comprising the step of accessing a test case for data to compute a selected metric.

7. The method, as set forth in claim 1, further comprising the step of accessing source files for data to compute a selected metric.

8. The method, as set forth in claim 1, further comprising the step of accessing a project file for data to compute a selected metric.

9. The method, as set forth in claim 1, further comprising the steps of:

providing a list of available report formats for selection by the user; and generating the report in response to the selected report format.

10. The method, as set forth in claim 1, wherein the list providing step comprises the steps of:

graphically displaying the list of available metrics; and permitting the user to select the displayed metrics.

11. A metric reporting system, comprising:

a metric collector adapted for receiving a user's specification of metrics;

a plurality of metric tools each being adapted for accessing data from a plurality of sources and computing a metric for a selected code under development in response to the user's specification; and a version control subsystem operable to integrate the metric into a software release process for the selected code under development.

12. The system, as set forth in claim 11, wherein the metric collector comprises a graphical users interface for displaying a list of available metrics for the user's selection.

13. The metric reporting system, as set forth in claim 11, further comprising a problem reporting tool from which the metric tools access data.

14. The metric reporting system, as set forth in claim 11, further comprising a build results directory from which the metric tools access data.

15. The metric reporting system, as set forth in claim 11, further comprising a test results file from which the metric tools access data.

16. The metric reporting system, as set forth in claim 11, further comprising a media download log from which the metric tools access data.

17. The metric reporting system, as set forth in claim 11, further comprising a test case from which the metric tools access data.

18. The metric reporting system, as set forth in claim 11, further comprising a source file from which the metric tools access data.

19. The metric reporting system, as set forth in claim 11, further comprising a project file from which the metric tools access data.

\* \* \* \* \*